United States Patent
Doring

[15] 3,687,349
[45] Aug. 29, 1972

[54] RIVETING APPARATUS
[72] Inventor: Erich Doring, Thalbachstrasse 8, Moosburg, Germany
[22] Filed: Nov. 18, 1970
[21] Appl. No.: 90,769

[30] Foreign Application Priority Data
Nov. 19, 1969  Germany..........P 19 58 058.6

[52] U.S. Cl.................................................227/61
[51] Int. Cl................................................B21j 15/36
[58] Field of Search...........................227/51, 61, 62

[56] References Cited
UNITED STATES PATENTS
1,698,922  1/1929  Rhodes.......................227/62
360,178   3/1887  Snedeker....................227/61

*Primary Examiner*—Granville Y. Custer, Jr.
*Attorney*—Silverman & Cass

[57] ABSTRACT

Apparatus for riveting unperforated layers of material supported on a counter-holder. The counter-holder has a recess for receiving the rivet shank such that the cross section of the recess in the area in which the closing head is formed is larger than the cross section of the rivet shank, and the depth of the recess is shorter than the portion of the rivet shank protruding from the layers.

6 Claims, 6 Drawing Figures

Patented Aug. 29, 1972 3,687,349
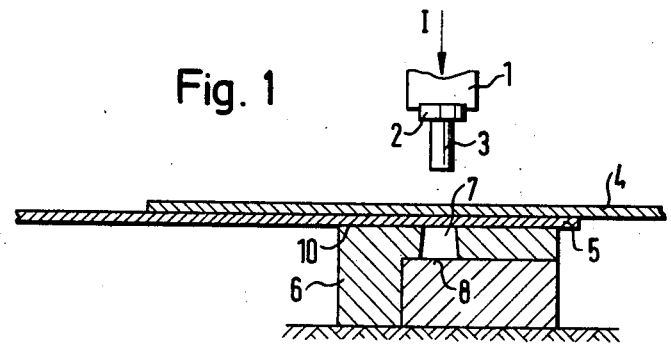
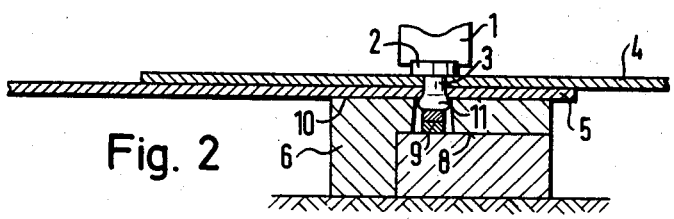
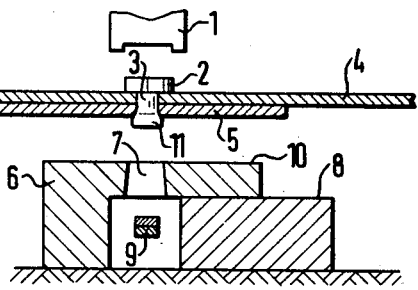
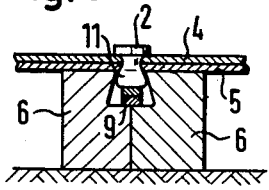
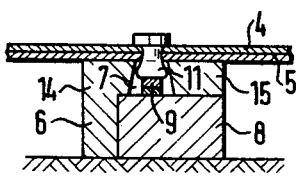
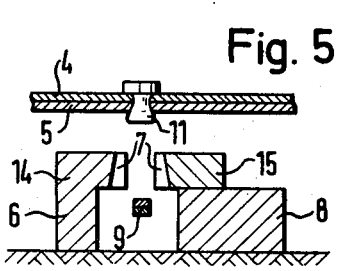
INVENTOR:
ERICH DORING
BY: Silverman & Cass
ATTORNEYS 3,687,349

RIVETING APPARATUS

BACKGROUND OF THE INVENTION

The invention relates to riveting apparatus, particularly to apparatus comprising a punch urging a rivet shank through unperforated layers of material, and a counter-holder for supporting the layers, having a recess for the rivet shank of particular configuration.

DESCRIPTION OF THE PRIOR ART

In a known riveting apparatus of the prior art the recess has a shoulder into which a washer is inserted. The riveting shank is driven by the punch thru the layers of material and the washer, and is moved on in this direction until a resilient stop abuts a stationary stop. Thus, as the rivet continues to move a firm counter-bearing for the rivet shank results, whereby a closing head is formed within the recess. The closing head is located behind the washer and it clamps the layers together with the washer.

In this riveting apparatus of the prior art, a washer is always required in addition to the rivet to establish the desired connection of the layers of material. This results in considerable expenditure in time and material which is unacceptable in mass production. Moreover, due to the mobile and stationary stops, the structure of the riveting apparatus is complex. Thus, the apparatus is expensive in structure and combersome in producing a riveted connection.

It is an object of the present invention to provide a riveting device of the above noted type which has a very simple structure and is capable of producing an efficient and simple rivet connection in a fast and inexpensive manner.

According to the invention the object is attained in that in the area of the supporting surface the cross-section of the recess is larger than the cross-section of the rivet shank, and that the bottom of the recess is immobile during the riveting operation. Thus, advantageously, a riveting apparatus is provided wherein without additional elements the closing head is formed within the recess. The riveting operation is thereby terminated and the layers of material are connected to one embodiment.

According to another embodiment of the invention, the cross-section of the recess may, in the area of the supporting surface, be at least equal to the maximum cross-section of the closing head formed, so that it is possible at once after the formation of the closing head to advantageously remove the layers from the riveting apparatus.

According to another embodiment of the invention, the recess may be of frustoconical design, wherein the smaller diameter is located in the area of the supporting surface. This structural design, results in an improved shearing effect, easier removal of the punched out material and a favorable configuration of the closing head.

Another embodiment of the invention provides that in the area of the supporting surface the cross-section of the recess is smaller than the largest cross-section of the closing head formed, wherein the counter-holder is longitudinally divided in the area of the recess. If the closing head to be punched shall be larger than the cross-section of the recess, the counter-holder is constructed with a longitudinal division and is opened as the closing head formed is moved out.

SUMMARY OF THE INVENTION

A riveting apparatus for connecting by riveting a plurality of unperforated layers of material having a counter holder and a recess therein. The depth of the recess is shorter than the portion of the rivet shank protruding beyond the layers of material. The bottom of the recess is kept immobile during the riveting operation. The rivet shank continues to move after perforating the layers and forms a counter head in the same moving operation.

BRIEF DESCRIPTION OF THE DRAWINGS

The invention is described in detail by virtue of an embodiment illustrated in the drawing in which FIGS. 1 to 3 show the riveting apparatus according to the invention during different phases of the riveting operation;

FIGS. 4 and 5 show another embodiment of the riveting apparatus of the invention;

FIG. 6 represents a further embodiment of the riveting apparatus according to the invention.

DESCRIPTION OF THE PREFERRED EMBODIMENTS

According to FIG. 1, the riveting apparatus according to the invention comprises a die or punch 1. The punch 1 upon moving in the direction of arrow I, presses the rivet shank 3 of a rivet 2—in this case a cylinder head rivet—through the layers of material 4 and 5 which rest on a supporting surface 10 of a counter-holder 6.

The counter-holder 6 has a recess 7, in the present case, of frustoconical design wherein the smaller diameter is in the area of the supporting area 10. The larger diameter of the frustum of the recess 7 is bounded by bottom 8 which is stationary during the riveting operation. According to FIG. 2 the punch 1 presses the rivet shaft through the layers of material 4 and 5, thereby punching two material platelets 9 out of the layers of material. These platelets 9 rest on the bottom 8. As the punch 1 continues to move, that part of the rivet shaft 3 which is in recess 7 is deformed by the pressure of the punch 1 into a closing head 11. The length of the part of the rivet shaft protruding over the layers of material is so dimensioned relative to the free depth of the recess 7 that a closing head 11 results whose largest diameter is smaller or at the most equal to the smaller diameter of the frustum of the recess.

Following the formation of the closing head 11, either the counter holder along with the bottom 8 is depressed, or the layers 4 and 5 are raised along with the rivet such that the closing head 11 of the rivet 2 emerges from the recess 7 (FIG. 3). Thus, the riveting connection is established. To remove the material platelets punched out, the bottom 8 can now be shifted laterally, so that the material platelets 9 can be stripped off and moved away. This operation advantageously is carried out simultaneously with the removal of the closing head 11 of the rivet from the recess 7.

According to another embodiment (FIGS. 4, 5) the counter-holder 6 may be constructed to comprise two parts and to again provide a longitudinally movable bottom 8, so that the recess 7 and the bottom can be moved apart in longitudinal direction.

If the closing head to be formed is to be larger than the diameter of the tapered recess 7 in the area of the layers 4 and 5, the counter-holder 6 and the bottom 8 are removed in longitudinal direction (FIG. 5) after the closing head has been formed and, thus, the rivet connection can be removed.

The two parts 14 and 15 of the counter holder 6 are moved apart only by a short distance, to assure the removal of the rivet connection. The bottom 8 shifts by a larger amount, so that the material platelets 9 which possibly may adhere to the bottom 8 due to the high pressure used, can forcibly be stripped off by this lateral motion.

In this way, the material platelets 9 are efficiently removed after conclusion of the riveting operation. If the pressures used are not that high and if there is no apprehension that the platelets 9 adhere to the bottom 8, the entire counter-holder may be constructed in two parts according to FIG. 6 so that it can be moved apart in the center, wherein the rivet connection is removed upward and the material platelets can drop out downward.

Other rivets, besides a cylinder head rivet also may be used in the riveting apparatus according to the invention in order to connect material layers preferably made of sheet metal. Furthermore, for connecting material layers of large surfaces several riveting devices may advantageously be arranged side by side according to the invention, resulting in a very rational way of riveting sheet metal layers which are to be connected.

On the whole, the riveting apparatus according to the invention will provide a quick and rational riveting operation, because the rivet merely must be urged through the layers of material, and in the continuation of the movement, the closing head is formed, and the riveting operation is terminated. However, the length of the part of the rivet shank protruding beyond the layers of material is so to be dimensioned such that in the second phase of the riveting process a closing head results, whose largest diameter may be equal to or larger than the smallest diameter of the recess. Besides being frustoconical, this recess also may be cylindrical for example, wherein the diameter of the closing head is to be so coordinated with the diameter of the cylindrical recess that easy removal of the rivet head from the recess is assured.

In summary, the riveting apparatus according to the invention is of very simple construction and has a high degree of efficiency, so that it can be used very advantageously particularly for connecting material layers of large surfaces.

I claim:

1. A riveting apparatus comprising
   a. means for driving a rivet shank of solid material having a first head through a plurality of unperforated layers of material, said means including a punch,
   b. a counter-holder including a cantilever and a supporting surface on the top thereof for supporting the layers, a recess in the cantilever for receiving the rivet shank, and a bottom member below the cantilever
   c. the cross-section of the recess, in the lower area thereof being larger than the cross-section of the rivet shank,
   d. the depth from the supporting surface to the bottom of the recess being shorter than the length of the rivet shank protruding beyond the layers,
   e. the cross-section of the recess in the area of the supporting surface being larger than the cross-section of the rivet shank,
   f. means for keeping the bottom of the recess immobile during the riveting operation,
   g. means for driving the rivet shank after perforation of the layers of material to the bottom of the recess for forming a second head of the rivet shank and
   h. means for effecting the perforation of the layers and the forming of the second head in one and the same moving operation.

2. A riveting apparatus according to claim 1, wherein the cross-section of the recess within the area of the supporting surface is equal to the maximum cross section of the second head.

3. A riveting apparatus according to claim 1 wherein the recess is of frustoconical configuration, the smaller diameter being in the area of the supporting surface.

4. A riveting apparatus according to claim 1, wherein in the area of the supporting surface the cross-section of the recess is smaller than the largest cross-section of the second head, the counter-holder being longitudinally divided in the area of the recess.

5. A riveting apparatus according to claim 1, wherein the counter-holder is a one piece structure, and the bottom is laterally removable.

6. A riveting apparatus according to claim 4, wherein the divided counter-holder has a longitudinally removable bottom.

* * * * *

PO-1050
(5/69)

UNITED STATES PATENT OFFICE
CERTIFICATE OF CORRECTION

Patent No. 3,687,349　　　　Dated August 29, 1972

Inventor(s) ERICH DORING

It is certified that error appears in the above-identified patent and that said Letters Patent are hereby corrected as shown below:

Column 1, line 45, delete "embodiment", substitute --another--.

Signed and sealed this 9th day of January 1973.

(SEAL)
Attest:

EDWARD M. FLETCHER, JR.　　　　　　　　　　ROBERT GOTTSCHALK
Attesting Officer　　　　　　　　　　　　　Commissioner of Patents